Figure 1:
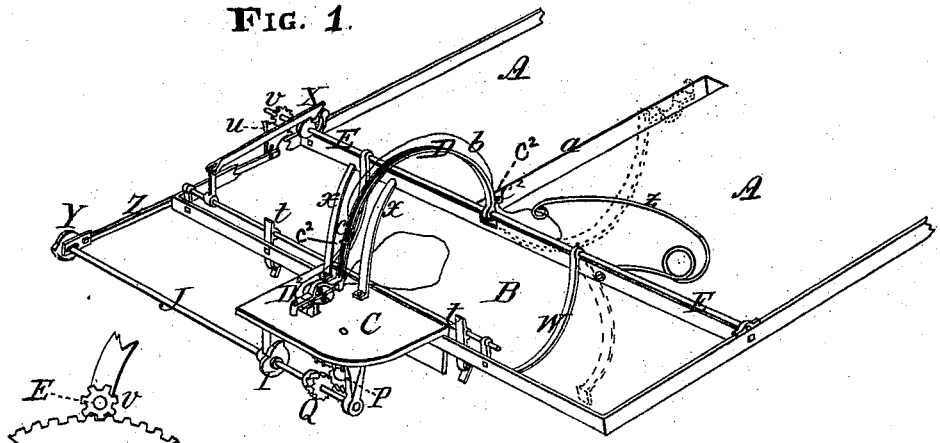

G. W. NICHOLS.
GRAIN-BINDER.

No. 173,045.  Patented Feb. 1, 1876.

WITNESSES
F. B. Townsend
J. H. Rutherford

INVENTOR
Geo. W. Nichols
By Johnson and Johnson
his Attys.

N. PETERS, PHOTO-LITHOGRAPHER, WASHINGTON, D. C.

G. W. NICHOLS.
GRAIN-BINDER.
No. 173,045.
Patented Feb. 1, 1876.
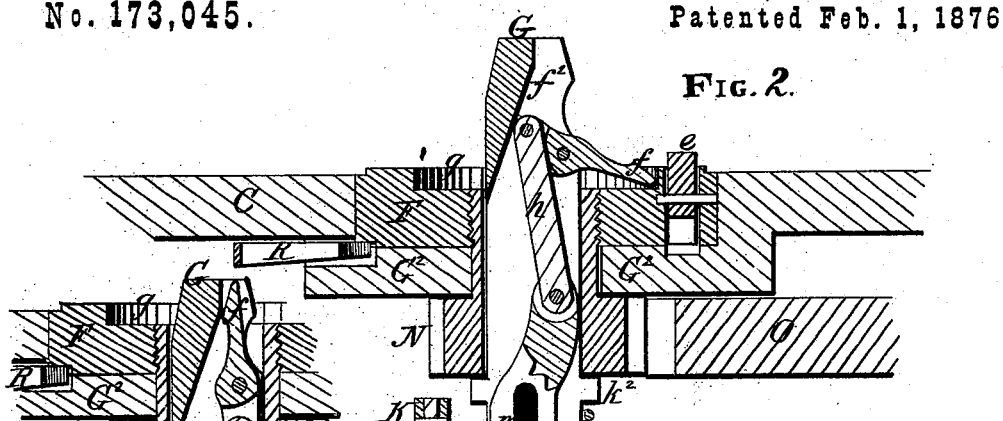
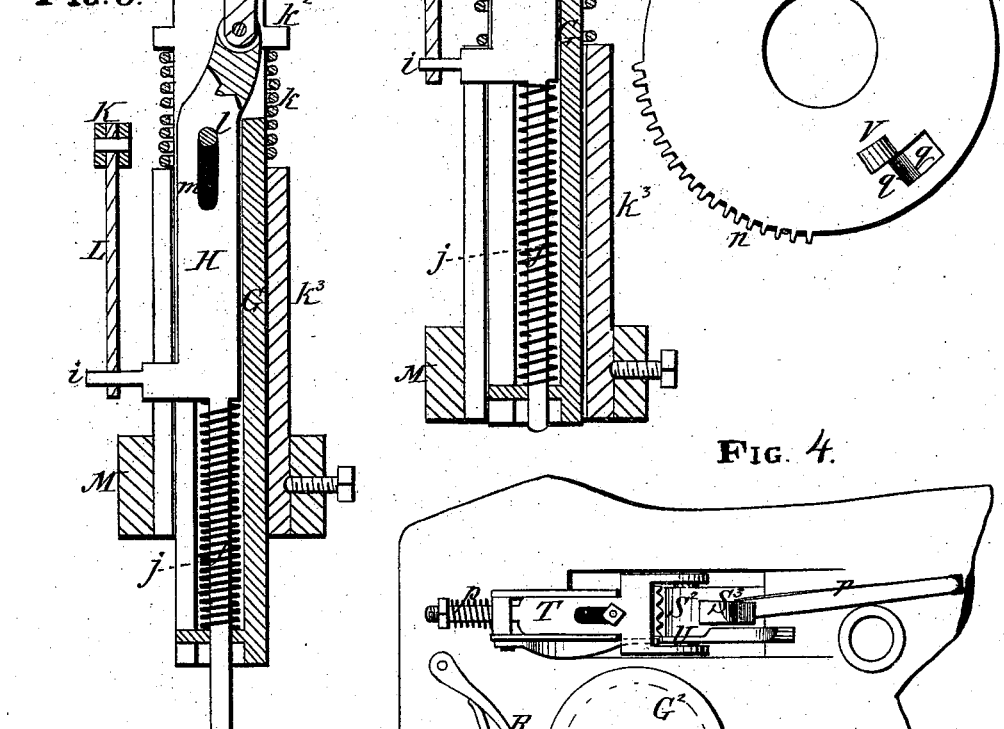
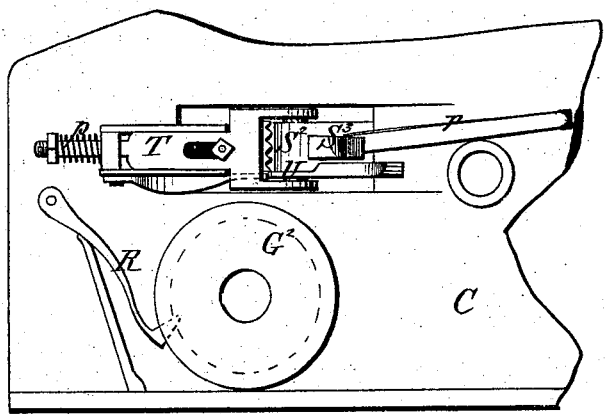
WITNESSES
F. B. Townsend.
J. H. Rutherford
INVENTOR
Geo. W. Nichols
By Johnson and Johnson
his Attys.

G. W. NICHOLS.
GRAIN-BINDER.
No. 173,045. Patented Feb. 1, 1876.
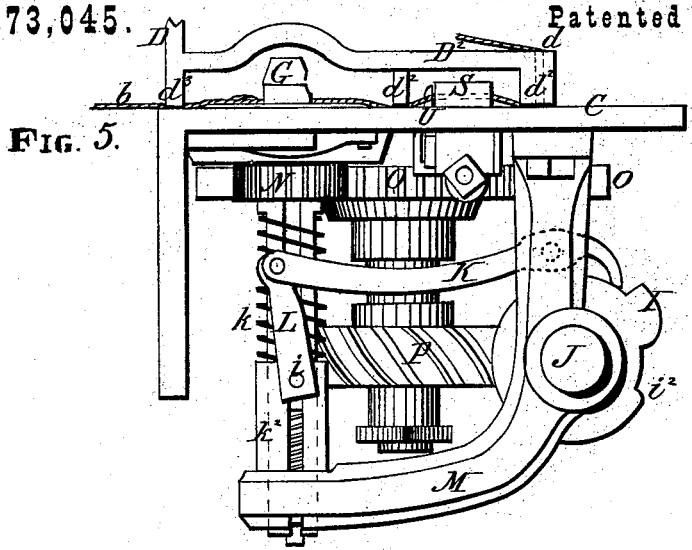
Fig. 5.
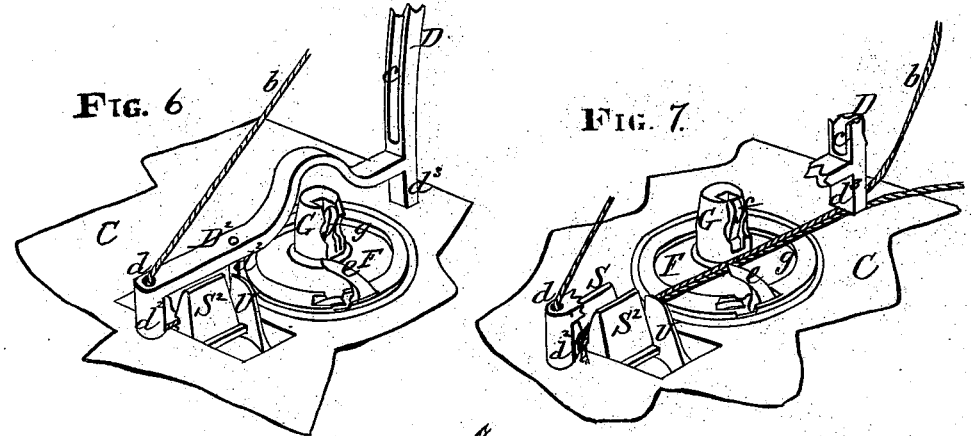
Fig. 6. Fig. 7.
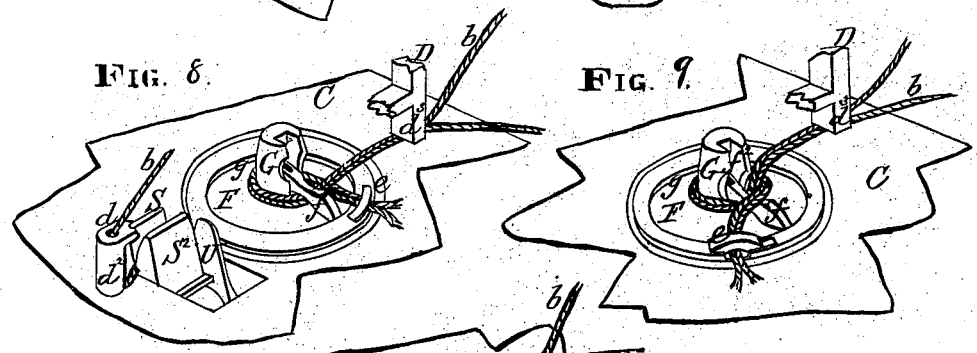
Fig. 8. Fig. 9.
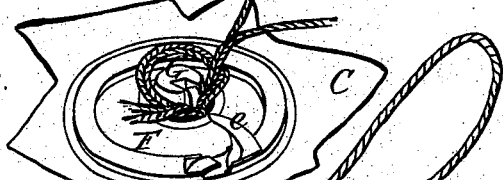
Fig. 10.
Fig. 11.
WITNESSES
F. B. Townsend
J. H. Rutherford
INVENTOR:
Geo. W. Nichols,
By Johnson & Johnson
his Attys.

UNITED STATES PATENT OFFICE.

GEORGE W. NICHOLS, OF COLDWATER, MICHIGAN, ASSIGNOR OF ONE-HALF HIS RIGHT TO NICHOLS GRAIN BINDER COMPANY, OF SAME PLACE.

IMPROVEMENT IN GRAIN-BINDERS.

Specification forming part of Letters Patent No. 173,045, dated February 1, 1876; application filed July 15, 1875.

*To all whom it may concern:*

Be it known that I, GEORGE W. NICHOLS, of Coldwater, in the county of Branch and State of Michigan, have invented certain new and useful Improvements in Grain-Binders for Reapers; and I do hereby declare that the following is a full, clear, and exact description thereof, which will enable others skilled in the art to which it pertains to make and use the same, reference being had to the accompanying drawing, and to the letters of reference marked thereon, which form a part of this specification.

A simple and effective device for binding grain with cord after it is cut and formed into bundles upon the reaper is the object of my invention.

The device is applicable to any machine in which the grain may be cut and delivered from the platform into a bundle-forming device, and is operated by the reaper in such manner as to pass a cord round the bundle, tie the knot, sever the cord, and discharge the bound sheaf.

In the example shown, the binder is applied to one end of the platform of the reaper, so that the cut grain may be delivered by a rake, or other means, directly upon the cord and two or more cradle-arms, which form the bottom of the bundle-forming space. As the bundle is delivered upon the cord which spans the receiving-space an arm passes over the bundle, and, carrying the cord with it, completes the encirclement therewith of the bundle, and brings the free end of the cord to the tying device. The cord is received from the spool or ball placed below the table, and carried back and forth over the bundle-receiver by this arm, which is mounted upon a rock-shaft, and descends through a slot in the platform, out of the way in delivering the grain to be received and bound. The cord, after being thrown over the bundle-receiving space, is placed between jaws, which seize and hold it, as shown in Fig. 6, while the arm passes back out of the way, to receive the bundle, thus leaving the cord over the space ready to receive the bundle, which being delivered thereon, the arm rises, and, carrying the cord over the bundle, brings the other end between the jaws, where they are both held, as shown in Fig. 7, and at this moment cut by the shears, and the bundle ends seized by a horizontally-pivoted finger, carried by an intermittently-revolving disk, while the end of the cord carried by the arm is still held by the jaws, as shown in Fig. 8. The bundle ends of the cord as soon as they are cut, and thus freed from the spool-cord, are carried round the spindle, which passes centrally through the intermittently-rotating disk, and, in making a revolution, the ends of the cord pass under that portion held between the spindle and the bundle-receiver, as shown in Fig. 8, and are drawn over and upon a hook (see Fig. 9) pivoted vertically within a recess in the spindle, and within which it closes radially as the spindle descends and carries the two cord ends with it through the loop formed by that portion of the cord which had been previously passed round the spindle, as shown in Fig. 10, and thereby forms the tie-loop, which is drawn into a knot (see Fig. 11) by the combined action of the descent of the spindle, the pivoted hook, and the expansion of the sheaf. As the hook is closing with the spindle to hold the cord, the horizontal finger in the disk releases its hold upon the ends, so as to free the cord from the binding device at the moment the knot is being formed.

The formation and completion of the knot, and the release of the cord, are effected by the intermittent revolving motion of the disk-finger, and the rising and falling movement of the central spindle device which carries the knot-forming hook, and these two devices co-operate in effecting this result with unerring certainty, and in harmony with the arm device which carries and delivers the cord round the bundle, and the jaw device which seizes and holds the cord during the operation of severing it from the continuous length, and carrying it back and forth over the cradle-space. As each knot is formed and tied, the cord-carrying arm operates to lay the cord across the bundle-receiver, and this is effected, just as each knot is tied, by the returning movement of the cord-carrying arm across the bundle-receiver, which, leaving the end of the cord held between the jaws, lays it across the bundle-receiver, and carries it back and forth beneath and over the grain-bundle, and to the knot forming and tying devices; and these movements all harmonizing to produce the best effect by the working of the reaper, and by suitable driving mechanism.

The returning movement of the arm takes place just as the hook-carrying spindle reaches its lowest point of descent, as shown in Fig. 10, in order to allow the expansion of the sheaf to act properly in drawing the cord to tighten the knot.

As the bundles vary in size I have combined with the cord-carrying arm a spring take-up, by which all slack in the cord may be taken up and the proper length of cord used for each sheaf, by taking up all surplus or slack, and thereby bind each bundle with the same tension, as the cord will be made to accommodate different sized sheaves by the automatic action of the take-up.

The bound sheaf is discharged by the automatic action of the arms which form the cradle of the bundle-receiver; and the opening and closing movement of these arms takes place simultaneously with the returning back movement of the cord-carrying arm. The cradle-arms are carried loosely by the same rock-shaft which carries the cord-carrier; but they are fastened in position by spring-catches, and brought into such position to be fastened by lugs on the rock-shaft; or other suitable means may be adopted for the purpose, so long as these cradle-arms are made to both open and close with the backward movement of the arm which throws the cord across the bundle-receiver.

Figure 13:
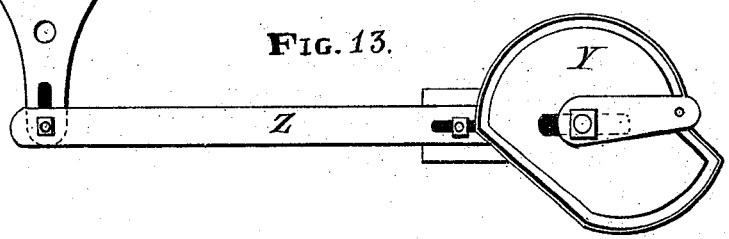
Figure 12:
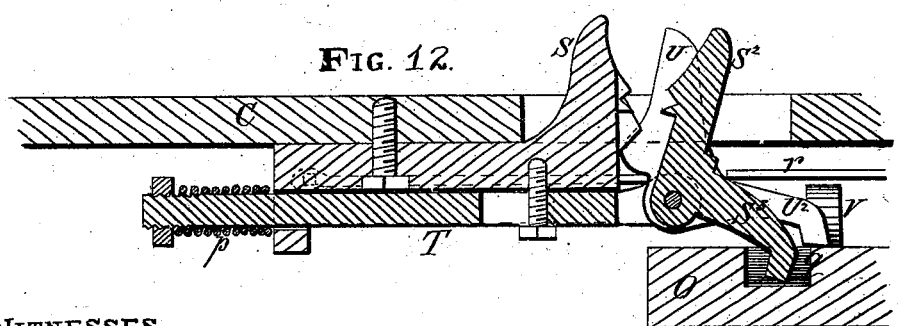

In the accompanying drawings, Figure 1, Sheet 1, represents a view in perspective, on a small scale, of my improved grain-binding attachment, as applied to a portion of the platform of a reaper; Fig. 2, Sheet 2, a vertical section of the knot-forming devices in the position the hook occupies to receive the cord after it is wound round the spindle; Fig. 3, same sheet, a similar section, showing the hook in the position it occupies when drawn into its recess to form the knot; Fig. 4, same sheet, a bottom view of a portion of the operating devices; Fig. 5, Sheet 3, an end view of the binding attachment; Fig. 6, same sheet, a perspective, showing the knot-tying devices in the positions they occupy when the machine is ready for work, with the single cord clamped between the jaws; Fig. 7, same sheet, a similar view, showing the knot-forming devices in positions after the cord has been passed round the bundle, and with the double cord held by the jaws; Fig. 8, same sheet, a similar view, showing the cord cut off, and its cut ends seized by the disk-finger and carried round the spindle to a position just before the cord is passed over and upon the spindle hook; Fig. 9, same sheet, a similar view, showing the cord in position over and upon the spindle-hook to be closed thereby with the spindle as the latter descends to form the knot; Fig. 10, same sheet, shows the devices in the positions they occupy after the completion of the knot, and while the spindle is at the limit of its descent; Fig. 11, same sheet, shows the knot as formed; Fig. 12, Sheet 1, a vertical section of the cord-holding jaws, shown in position to receive the cord; Fig. 13, same sheet, a detached view of the mechanism for operating the cord-carrying arm and the bundle-holding arms by means of the rock-shaft upon which said arms are mounted; and Fig. 14, same sheet, a view of one of the cradle-arms, showing one of the lugs which engages with a similar lug on the rock-shaft to close the cradle-arms with their spring-catches to receive the unbound bundle.

All these figures, but the first, are drawn on enlarged scales.

An apron, A, is constructed in any suitable manner to form an extension of the reaper-platform, to receive the cut grain therefrom in a position to be delivered to the binder. At the termination of this apron an opened-space grain-receiver, B, is arranged to receive the grain lengthwise therein, and outside of this grain-receiver is arranged the knot-tying device upon a fixed plate, C, suitably secured to the frame-work of the receiver, and on a level with the top thereof.

The binder consists primarily of three devices—namely, a device for carrying the cord over the bundle-receiving space and round the bundle; a device for holding the encircled ends of the cord, and the device for tying the knot.

Figure 14:
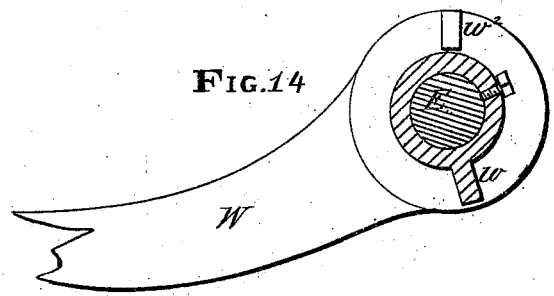

A cord-carrying arm, D, of semicircular form, shown in Figs. 1 and 6, is fixed upon a rock-shaft, E, Figs. 1 and 14, arranged at the inner edge of the grain-receiving space B, and operated by the rock-shaft, to carry and hold it beneath the table A through a slot or opening, $a$, therein, to allow the grain to be delivered over the arm and in position to be received thereby and turned over quickly into the receiving-space B, when, by the action of the rock-shaft E, said arm D is caused to span the said space. The cord $b$ is carried over and upon the arch of the arm D, and is held within a groove, $c$, by eyes $c^2$, Fig. 1, at suitable distances apart, so that it cannot be displaced from the arm. The cord is received at the connected end of the arm and carried back and forth at its free end over the bundle-receiving space. The bow D is a little wider than this space, and terminates in a branch, $D^2$, of proper length, and through an eye, $d$, in the end of which the cord $b$ passes to make a connection with the holding-jaws. In the movement of the arm to turn the grain into the receiver B this branch $D^2$ will just touch the surface of the plate C, and, by means of the projections $d^2$ $d^2$, hold and press down upon the cord until it is griped by the jaws, and that part carried by the arm and held by the jaws severed from that part which is to be tied into the knot, as shown in Fig. 8. A third projection, $d^3$, at the point where the branch $D^2$ joins the bow D, serves to hold the double cord $b$ near the bundle while the severed ends are being tied. (See Figs. 7, 8, 9.) These three projections, therefore, serve important functions in connection with the tying device proper, which is arranged between the two inner projections $d^2$ $d^3$, and in a line coincident therewith.

The tying device proper consists of two parts—viz., a horizontally-intermittent rotating disk, F, provided with a finger, $e$, pivoted near its circumference, and a vertically-moving spindle, G, provided with a hook, $f$, pivoted to be opened and closed in a recess, $f^2$, in the side of the spindle. The disk F is arranged within a depressed case, $G^2$, formed in the plate C, and is on a level with the surface thereof. An annular depression, $g$, is formed in its upper surface to receive the hook $f$ in a position to pass beneath the ends of the cord held by the finger $e$, as the disk revolves to carry the cord round the spindle and over the finger. The finger $e$ is pivoted to be opened and closed with the disk F to receive and clamp the severed ends of the cord and carry said cord round the spindle by the turning of the disk. In this action the finger is brought down upon the cord by means of a cam-shaped bearing on the bottom of the case $G^2$ acting upon a curved inner branch of the finger, and it is opened when said inner branch comes opposite a recess in the bottom bearing, into which recess the inner branch of the finger is forced by a spring arranged in the disk for the purpose.

A spring is also arranged in the finger-recess, upon which to clamp the cord and to accommodate and hold different thicknesses of cord, and prevent the ends being pulled out by the action of the hook, and before the time comes for the release of the cord from the finger. The spindle G is arranged to rise and fall through a central opening in the disk F, and the hook $f$, which it carries, is jointed, by means of a link, $h$, to the upper end of a plate, H, arranged within said spindle, which is made hollow or slotted for that purpose, as shown in Figs. 2 and 3. The jointed connection allows the hook end $f$ to descend into the annular depression $g$, and to rise vertically in the recess $f^2$ by the rising and falling action of the plate H, which is effected by a cam, I, on the shaft J, acting upon the end of a lever, K, pivoted to a hanger, M, from the plate C, and connected by a link, L, to an arm, $i$, of the plate H, which moves in a slot in said spindle. The action of the cam I, as it comes in contact with the lever K, is to pull down the jointed plate H and raise and close the hook $f$ with the cord within the recess $f^2$, and hold the cord against the inside thereof, while the spindle is depressed by the continued action of the cam to slip the cord over the upper end of the spindle, and complete the tie by closing the slack to make the knot by the expansion of the bundle of grain. The hook $f$ is thrown out into proper position to pass beneath the held ends of the cord by means of an offset, $i^2$, Fig. 5, in the cam, and the action of a coiled spring, $j$, confined within the lower hollow end of the spindle, and this action takes place just before the descent of the spindle, while the spindle itself is forced up, when the lever passes the cam I, by the coiled spring $k$ placed over the spindle, and bearing upon a collar, $k^2$, on the spindle, and a sleeve, $k^3$, on the lower end of the hanger M, and through which sleeve the spindle passes. The hook and the spindle are thus operated by the same cam, and by springs acting independently upon each. The limit of the ascent of the spindle is governed by the collar $k^2$ coming in contact with the lower side of pinion N, fixed to the lower end of a sleeve, which passes the case $G^2$, and is screwed into the finger-carrying disk F, and by which pinion the latter is made to revolve, as shown in Figs. 2 and 3. The limit of the ascent and descent of the hook-carrying plate H is governed by a pin, $l$, in the spindle passing through a slot, $m$, in the jointed plate.

The rotary movement of the disk is intermittent, to effect, in conjunction with the vertically-moving spindle, the tying of the knot and the release of the tied cord from the spindle and its hook. This intermittent rotary movement is produced by a wheel, O, having teeth $n$ on about one-fourth of its circumference. (See Sheet 2.) This wheel O is suspended by a vertical support from the plate C, and is driven by a pinion, P, meshing into a similar pinion, Q, on the shaft J, which carries the cam. (See Figs. 1 and 5.)

A spring-detent, R, Fig. 4, passes through an opening in the side of the case $G^2$, and enters a notch in the periphery of the disk F to hold it in the proper position when the cogs $n$ of the wheel O leave the pinion N, and by this means also hold the latter in position to always receive the intermeshing of the segmentally-toothed wheel.

This wheel O also operates the jaws for holding the cord during the operation of binding the grain, and the knife for severing the ends of the cord to be tied. These jaws are secured to the plate C outside of the disk F, and in line with the spindle and the cord-carrying arm D, and they consist of a fixed and movable jaw, S $S^2$, arranged to be opened and closed at right angles to the line of the cord. They are toothed on their inner sides to properly hold the cord, as shown in Fig. 12, Sheet 1. The movable jaw $S^2$ is pivoted to the inner end of a bar, T, held in place by suitable guides, and capable of yielding by means of a spring, $p$, to accommodate different thicknesses of cord; otherwise the function of the jaws might be uncertain to properly hold the cord. This jaw $S^2$ has an L-branch, $S^3$, by which it is operated by the wheel O, which has an opening, $q$, Sheet 2, Fig. 12, into which the branch $S^3$ is forced by a spring, $r$, as the wheel turns to open the jaws at the proper moment, and the beveled side $q^2$ of said opening almost instantly lifts the branch $S^3$ and closes the jaw, and holds it closed by resting upon the face of the wheel. Simultaneously with the closing of the jaws to hold the cord the knife U is closed with the side of the fixed jaw S, which act like shears to cut the ends of the cord, and leave them free to be caught by the finger $e$, which seizes them before they are thus cut. This action of the knife is effected by a cam-projection, V, on the face of the wheel O, passing, as the latter revolves, under the end $U^2$ of a weighted L-branch of the knife, which, being pivoted to the bar by the side of the movable jaw, is operated, as stated, at the proper time, which is governed by the action of the cam V, in harmony with that of the jaws and the tying devices. The weighted arm $U^2$ holds the knife open. As soon as the tying of the bundle is completed, and the cord cut, the cradle-arms W are released from their spring-catches $t$, and the bound bundle is delivered therefrom, and the cradle-arms again brought up and caught by the catches by the action of proper devices X, Fig. 1, operated by the shaft E, which carries the cord-carrying arm, and which shaft E is operated by a suitable cam, Y, on the shaft J, the connection of the two shafts being made by a connecting-rod, Z, which carries a sector, $u$, arranged to match with a pinion, $v$, on the rock-shaft E, so that the connecting-arm Z vibrates the sector $u$, and through it operates the cord-carrying and cradle arms by the cam Y and suitable lugs $w$ on the shaft E, acting upon lugs $w^2$ on the cradle-arms W, as shown in Fig. 14. By means of the arm Z connecting the driving and rock shafts the proper adjustment of the cord-carrying arm D can always be made, as shown in Fig. 13.

The plate C is provided with suitable fenders $x$, Fig. 1, to prevent the grain being thrown upon the plate as the bundle is turned over into the receiving-space.

The bundles of grain delivered to the cradle-arms necessarily vary in size, and to compensate for this variation, and bind each bundle with the same degree of tension, I employ a spring take-up, $z$, Fig. 1, through an eye in which the cord passes from the spool to the eye $c^2$ of the carrying-arm D, so that the action of the take-up will be such as to always produce and maintain the proper degree of tension upon the cord, and thereby accommodate the cord to the size of the bundle, and tie it with the requisite degree of tightness.

I claim—

1. The combination, in a grain-binding attachment for harvesters, of an intermittently-rotating disk, F, carrying a horizontally-pivoted finger, $e$, with a vertically-intermittent moving spindle, G, carrying a vertically-pivoted hook, $f$, having a radially opening and closing movement therewith, substantially as herein set forth.

2. The combination, with intermittently-rotating cord-seizing finger $e$ and pivoted hook $f$, constructed to operate jointly, as described, of the cord-carrier D $D^2$, having the cord-guide $d^2$, and the heel cord-holder $d^3$, and the cord-holding jaws S $S^2$, the whole being arranged and adapted to operate in the manner substantially as herein set forth.

3. The combination, with the intermittent horizontal rotating pivoted finger $e$, the knot forming and tying device G $f$, constructed to operate as described, of the cord-holding jaws S $S^2$ and the knife U, arranged and adapted to operate in the manner substantially as herein set forth.

4. The combination, with the arm D $D^2$ and the opening $a$ in the platform, of the grain-receiver B, the cord $b$, and the cord-holding and tying devices, consisting of the jaws S $S^2$, spindle G, its pivoted hook $f$, and the disk-finger $e$, constructed and adapted to operate substantially as herein set forth.

5. The combination, with the spindle G, of the cam I and the lever-connection K, whereby the spindle is caused to descend at the proper point in the operation of forming the tie, and to cause the tie end to be slipped over the end of the spindle, substantially as herein set forth.

6. The combination, with the spindle G and the tie-forming hook $f$ pivoted thereto, of the jointed connection H $h$, the spring $j$, and the lever K, whereby the hook is operated in the manner and for the purpose herein set forth.

7. The combination of the pivoted tie-forming hook $f$ with the recess or depression $g$ in the surface of the intermittent rotating disk F, whereby the hook $f$ is turned down in position to pass beneath the ends of the cord held by the finger $e$ in making the tie, substantially as herein set forth.

8. The stop $l$ in the spindle G, in combination with the slot $m$ in the jointed connection H of the pivoted tie-forming hook and the spring $j$, whereby the ascent of the latter is limited, substantially as herein set forth.

9. The combination, with the spindle G and the pinion which operate the intermittent rotating disk F, of the stop $k^2$ on said spindle, and the spring $k$, whereby the ascent of the latter above the disk is limited, substantially as herein set forth.

10. The combination, with the pivoted cord-holding jaw $S^2$ $S^3$, of the opening or depression $q$ $q^2$ in the wheel O, and the spring $r$, whereby the said jaw is both opened and closed with the fixed jaw S at stated points during the rotation of said wheel, substantially as herein set forth.

11. The segmently-cogged wheel O, and its intermatching disk-sleeve pinion N, for intermittently operating the disk-finger $e$, provided with the cam-projection V and the depressed cam $q$ $q^2$, in combination with the cord-severing knife U $U^2$ and the cord-holding jaws S $S^2$, whereby the pivoted cord-seizing finger $e$, the knife, and the jaws are made to co-operate in their functions by the continuous rotation of the wheel O, substantially as herein set forth.

12. The combination, with the pivoted jaw $S^2$, and the bar T which carries it, of the spring $p$, whereby a variable grasp is given to the jaws to compensate for different thicknesses of cord, substantially as herein set forth.

13. In an automatic binding attachment for harvesters, the combination, with the intermittently-rotating disk F, its horizontally-pivoted finger $e$, and operating gear N O, of the spring-detent R, arranged to arrest and hold the disk with its finger in proper relation to the hook of the spindle, and to insure the proper meshing of the pinion N with the segmental toothed wheel O, substantially as herein set forth.

14. The combination, with the cord-carrying arm D and its rock-shaft E, of the cradle-arms W and the lugs $w$ and $w^2$, whereby the cradle-arms are opened downward, and again closed with the grain-space by the same mechanism which operates the cord-carrier, substantially as herein set forth.

15. The combination, with the rock-shaft E and the cradle-arms W, of the spring-catches $t\,t$ and the device X, operated by the rock-shaft, whereby the cradle-arms are released from their catches to open the cradle and deliver the tied bundle, substantially as herein set forth.

In testimony that I claim the foregoing I have affixed my signature in presence of two witnesses.

GEORGE W. NICHOLS.

Witnesses:
  A. E. H. JOHNSON,
  J. W. HAMILTON JOHNSON.